B. K. APPLEMAN.
STARTING MECHANISM FOR EXPLOSIVE ENGINES.
APPLICATION FILED JULY 21, 1913. RENEWED NOV. 13, 1915.
1,187,799.
Patented June 20, 1916.
6 SHEETS—SHEET 1.
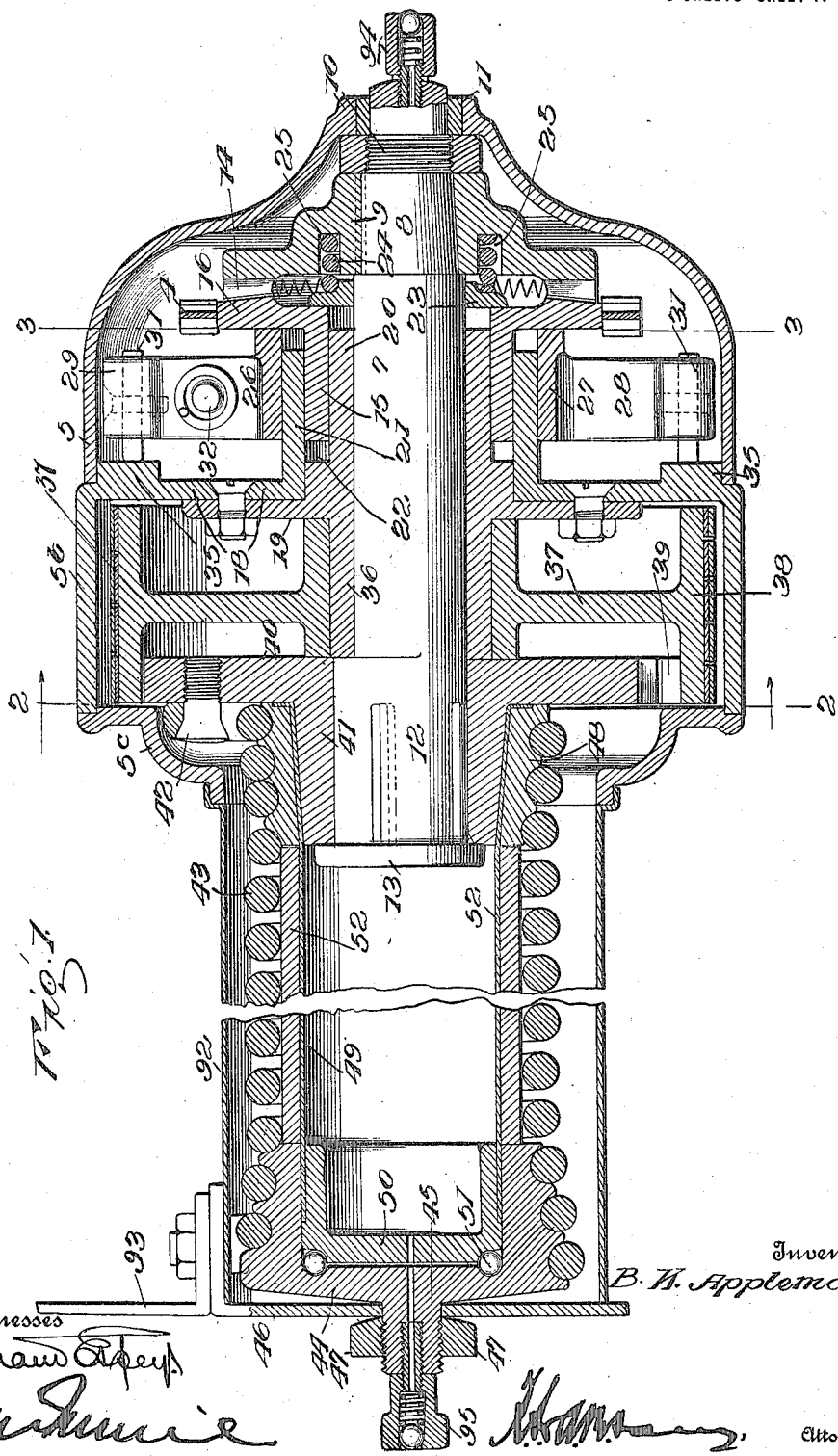

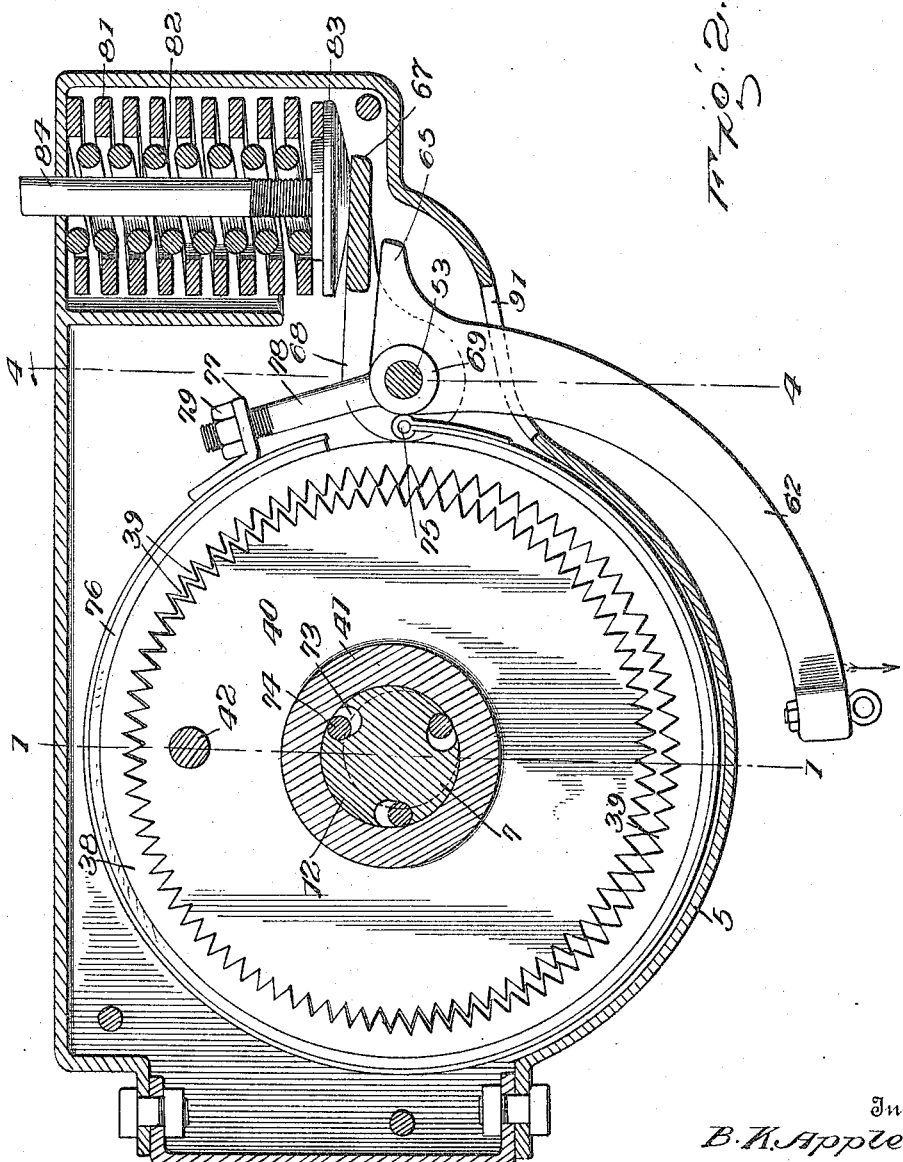

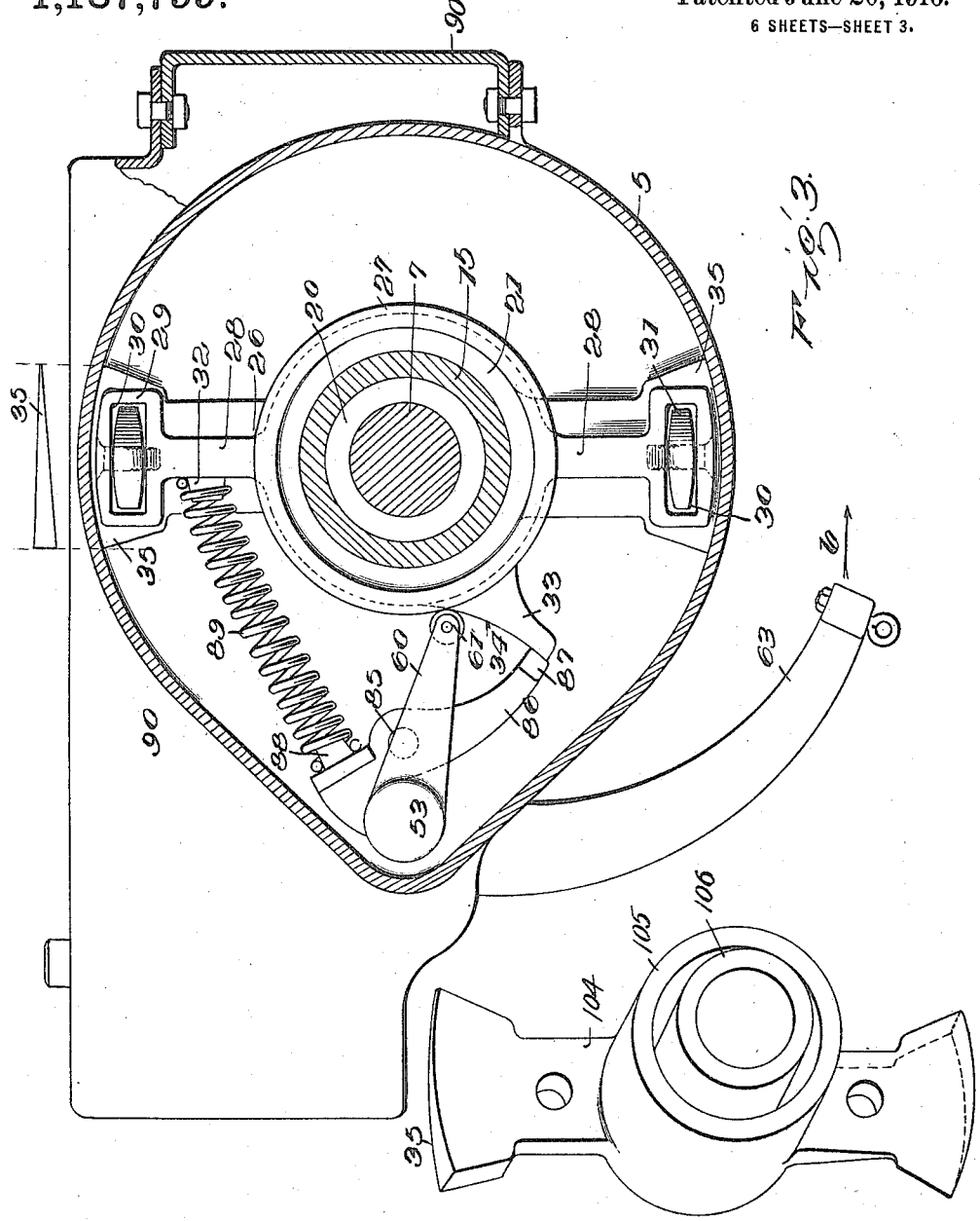

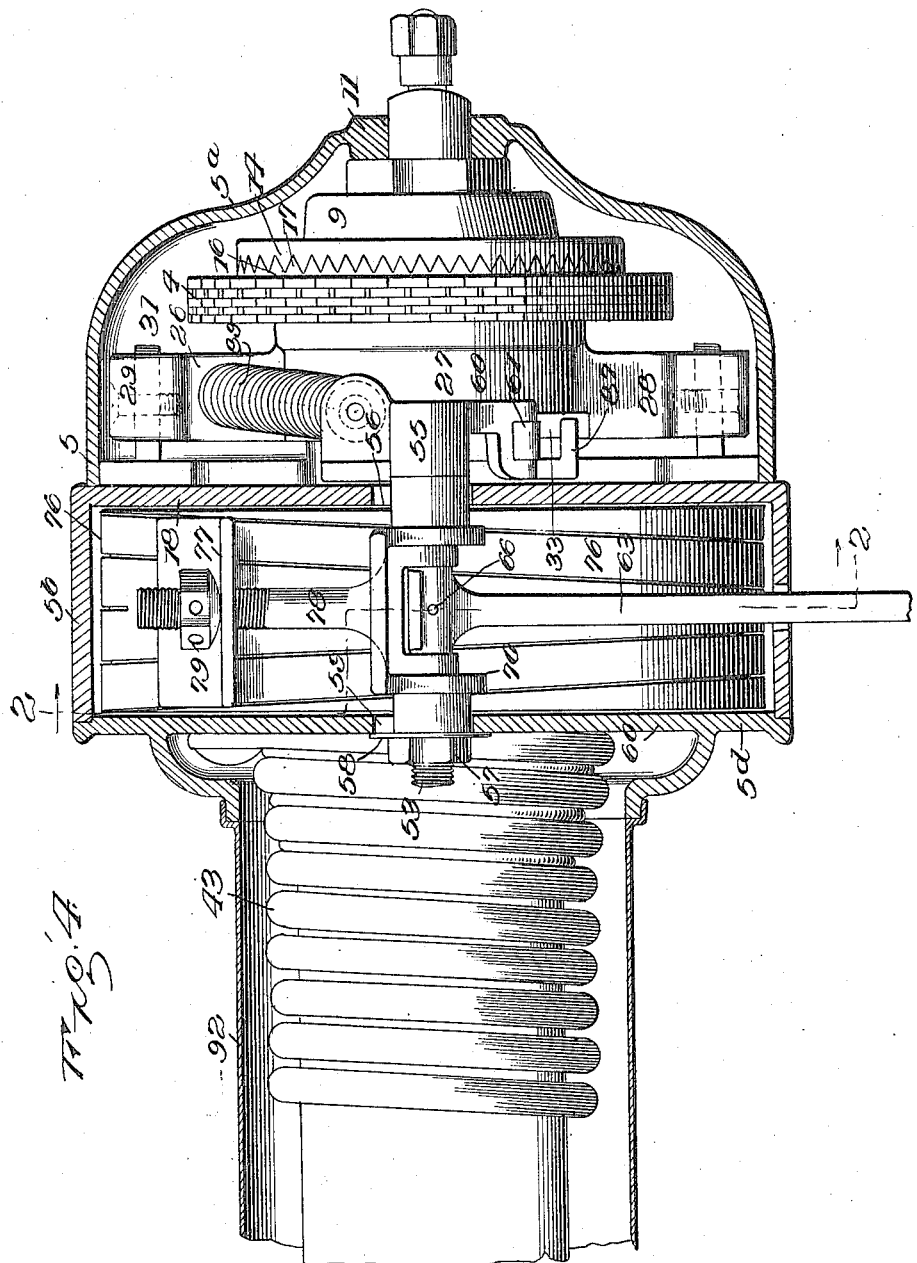

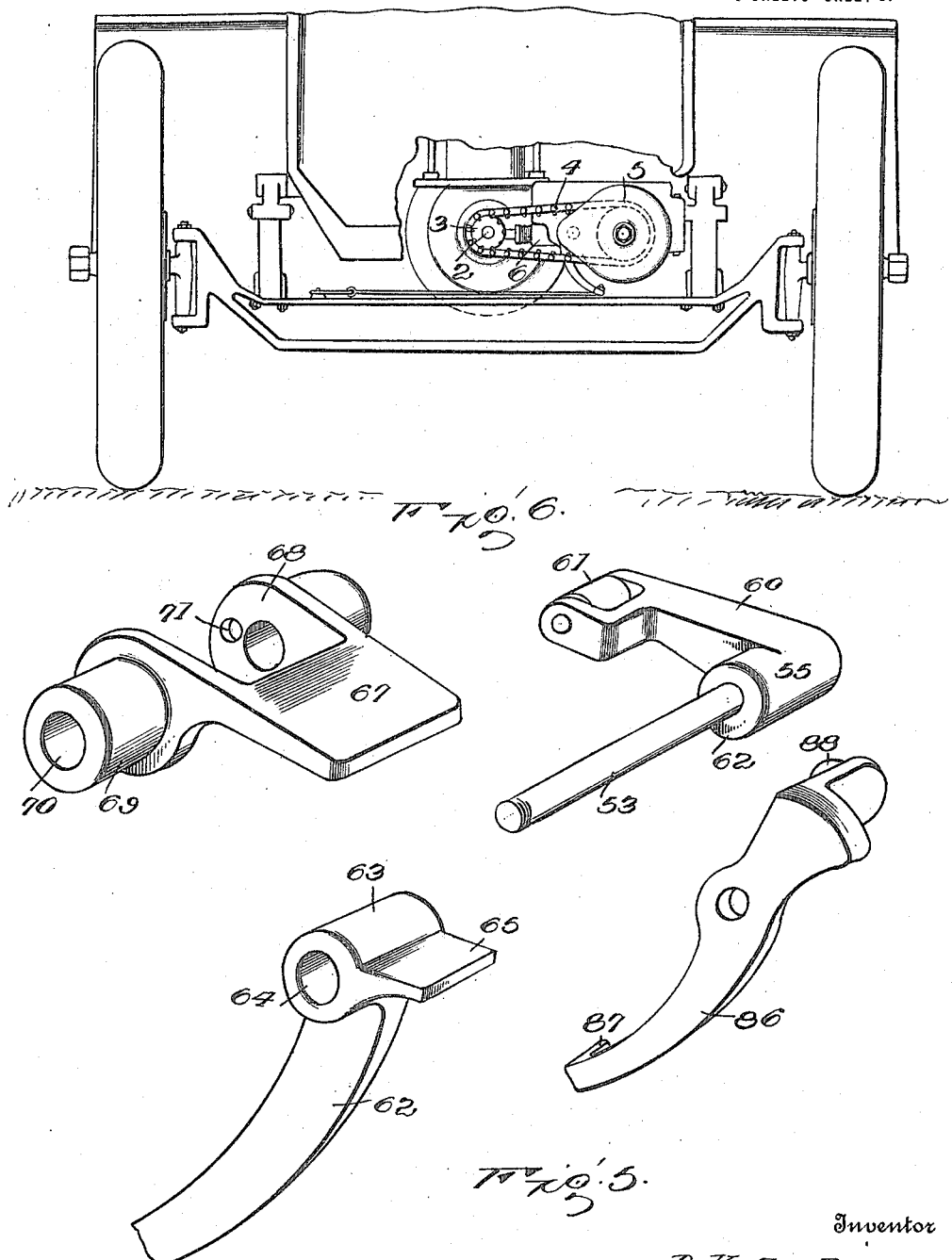

B. K. APPLEMAN.
STARTING MECHANISM FOR EXPLOSIVE ENGINES.
APPLICATION FILED JULY 21, 1913. RENEWED NOV. 13, 1915.
1,187,799.
Patented June 20, 1916.
6 SHEETS—SHEET 6.
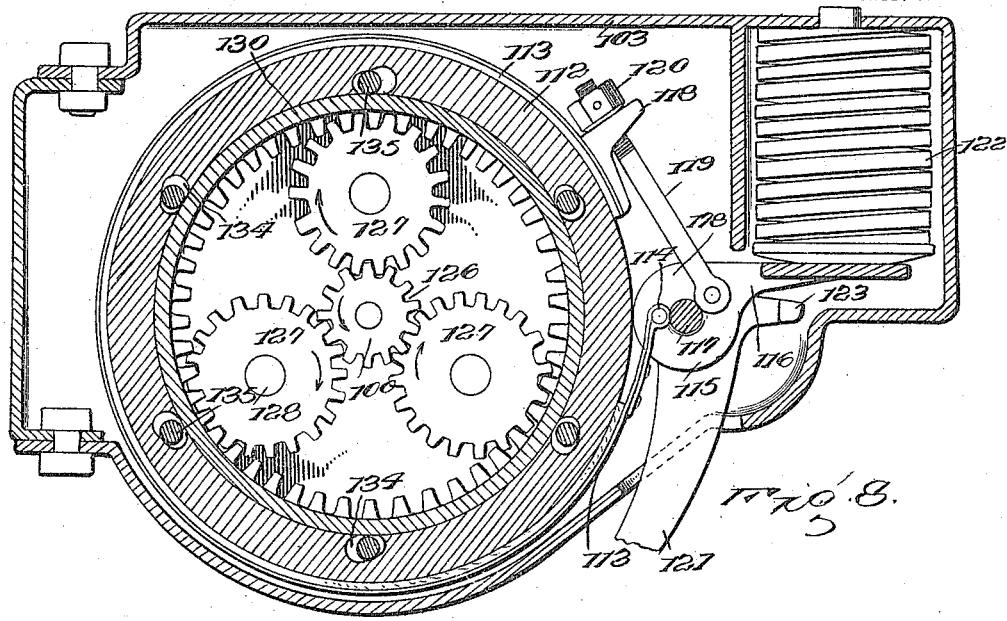
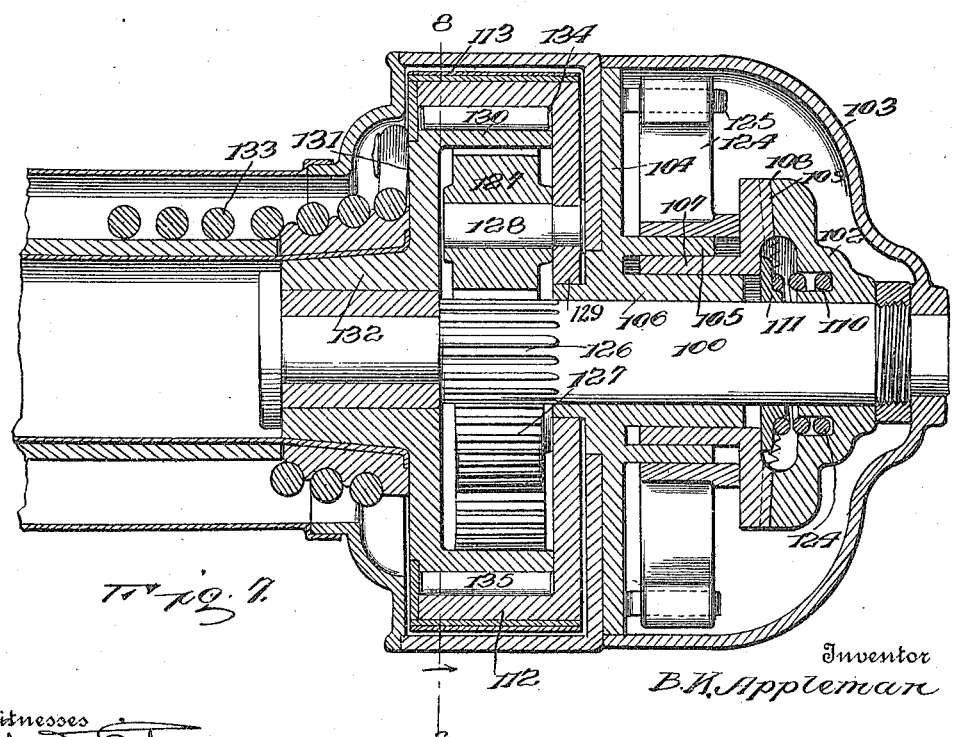

UNITED STATES PATENT OFFICE.

BOYD K. APPLEMAN, OF BEAUMONT, TEXAS.

STARTING MECHANISM FOR EXPLOSIVE-ENGINES.

1,187,799. Specification of Letters Patent. Patented June 20, 1916.

Application filed July 21, 1913, Serial No. 780,246. Renewed November 13, 1915. Serial No. 61,443.

*To all whom it may concern:*

Be it known that I, BOYD K. APPLEMAN, a citizen of the United States, residing at Beaumont, in the county of Jefferson and State of Texas, have invented certain new and useful Improvements in Starting Mechanism for Explosive-Engines, of which the following is a specification.

My invention relates to mechanism for starting internal combustion engines, and particularly that form of starting devices in which a torsion spring is used.

The object of the invention is to provide means whereby the spring after it has started the engine may be automatically wound up by the continued operation of the engine and put in condition for use again.

A further object is to provide a mechanism for winding the torsion spring which shall be entirely automatic in its action and which, as soon as the engine starts and the starting mechanism is released, will rewind the spring to a predetermined degree.

A further object is to provide means whereby the tension given to the spring when winding it up may be regulated.

A still further object is to provide means whereby when the spring is wound to a certain degree of tension the further winding of the spring shall be rendered impossible, thus preventing any breaking of the spring or the parts connected thereto.

A further object is to provide means whereby the torsion spring may receive power at one end whereby the torsion spring may be wound up and deliver its power at the same end.

A further object is the provision of a mechanism of the character described in which a clutch is used for connecting the spring-operated shaft of the starting mechanism to the shaft of the engine, the actuation of this clutch releasing a brake or other holding means which holds the spring from rotation and action, and the provision in connection therewith, of mechanism which when the engine has been started upon the release of the actuating lever, will cause the reëngagement of the brake operatively with the spring whereby the continued operation of the engine will act to rewind the spring until a certain tension is reached, whereupon the clutch will be automatically thrown out and the parts of the starter locked from further operation.

Further objects will appear in the course of the following description.

My invention is illustrated in the accompanying drawings, wherein:—

Figure 1 is a longitudinal diametrical section through my improved starting mechanism, upon line 1—1 of Fig. 2. Fig. 2 is a transverse section on the line 2—2 of Fig. 1. Fig. 3 is a transverse section on the line 3—3 of Fig. 1. Fig. 4 is a side elevation of the starting mechanism, the casing or shell inclosing the starting mechanism being in section on line 4—4 of Fig. 2. Fig. 5 is a perspective view of the actuating lever, the latch, the brake-band lever, and the carrier rotating arm, parts being separated from each other. Fig. 6 is a front view of an automobile, the hood being broken away and showing my improved engine starting mechanism, as applied thereto. Fig. 7 is a longitudinal diametrical section of a modified form of my starting mechanism. Fig. 8 is a transverse section on the line 8—8 of Fig. 7. Fig. 9 is a perspective detail view of the member 104 and its spaced sleeves 105 and 106.

Corresponding and like parts are referred to in the following description and indicated in all the views of the accompanying drawings by the same reference characters.

Referring now to Fig. 6 the automobile shown therein is supposed to be of any ordinary type and construction, and 2 designates the engine shaft having thereon a sprocket-wheel 3 over which passes a sprocket-chain 4. 5 designates the casing of my improved starting mechanism. The casing is supported on a suitable frame, as will be later stated, and the sprocket-wheel 3 is supported from this frame by means of a transverse brace or bracket 6, screw-threaded to permit of the adjustment of the sprocket-wheel 3 with relation to the shaft of the starting mechanism. It will be seen then from Fig. 6 that the shaft 2 of the engine and the shaft of the starting mechanism are extended parallel to each other and are operatively connected to each other by the sprocket-chain 4 so that when the starting mechanism is operated, power will be delivered by means of the sprocket-chain 4 to the shaft 2 and vice-versa, that power will be delivered from the shaft 2 to the starting mechanism to rewind the spring, as will appear more fully later on.

Referring now to Figs. 1, 2, 3 and 4 it will be seen that my mechanism comprises a shaft 7, the forward end of which is reduced as at 8, and has mounted thereon a clutch-member 9, this clutch-member rotating with the shaft 7. That end of the shaft 7 beyond the reduced portion 8 is screw-threaded as at 10, and the still further reduced end rotates in bearings 11 formed in the casing 5, or in any suitable manner. The rear end of the shaft 7 is formed with an eccentric 12 and with an enlarged head 13. The clutch member 9 is formed on its inner face with an annular series of clutch-teeth 14 and co-acting with the clutch-member 9 which is fixed upon the shaft 7 is a rotatable co-acting clutch-member 15. This clutch-member 15 comprises a sleeve which extends concentrically to the shaft and an annular flange 16 having thereon clutch teeth 17 which co-act with the clutch-teeth 14 on the clutch member 9. The flange 16 forms a sprocket wheel and is provided with sprocket teeth with which the chain 4 engages. The casing 5 is formed in three parts or sections 5ª, 5ᵇ and 5ᶜ. The section 5ᵇ surrounds the brake-band and brake, as will appear more fully later, and has an inwardly projecting annular flange 18 formed with a laterally projecting annular flange 21. Bolted or otherwise attached to this flange is a bearing member 19 having a flange 20 spaced from and concentric to the flange 21, both flanges 20 and 21 being concentric to the shaft 7. The space 22 between these annular flanges is annular in form and within this space the sleeve of the clutch member 15, previously referred to, is shiftably and rotatably supported.

Disposed around the shaft 7, near the beginning of its reduced portion 8 is a leather or fiber washer 23, as shown most clearly in Fig. 1, which bears against the outer end of the clutch-member 15, and which is forced against this outer end by means of a coil-spring 24 which is disposed within an annular pocket 25 formed in the clutch-member 9 and which acts to force the clutch-member 15 inward so that its teeth 16 are normally out of engagement with the teeth 14 of the clutch-member 9. It will be obvious now that the clutch-member 15 may be shifted outward, that is toward the clutch-member 9 and against the force of the spring 24, and that when so shifted its clutch teeth will engage with the clutch-teeth of the member 9 so that any power transmitted by the sprocket-chain 4 to the clutch-member 15 will in turn, under these circumstances, be transmitted to the clutch-member 9 and thus to the shaft 7.

Rotatably mounted upon the exterior of the flange 21 and longitudinally shiftable upon this flange with the clutch-member 15 is a carrier designated generally 26, comprising a ring or collar 27 from which project the radial diametrically opposed arms 28. These arms at their outer ends are laterally enlarged as at 29 and longitudinally slotted as at 30 and disposed in these slots are the rollers 31, these rollers extending transversely in the direction of the arms 28. One of the arms 28, as the uppermost arm for instance, is provided with an outwardly projecting stud 32 for engagement with a compression spring, as will be later stated, and the ring 27 is formed in one portion of its circumference with a downwardly and laterally extending lug 33, the upper face of which is concavely curved as at 34, the lug 33 extending approximately tangential to the ring 27 upon which the arms 28 are mounted. The central sleeve or ring 27 bears at its end against the inner face of the flange 16 of the clutch member 15. The member 19 extends transversely across the casing and as previously stated is rigidly bolted to the flange 18. This flange 18 is formed at diametrically opposite points with the wedges 35, these wedges being disposed in a line of movement of the rollers 31 and one wedge being wedge-shaped in opposite direction to the other wedge. These wedges 35 constitute cams which as the carrier 26 is rotated, act to force the carrier outward, that is in the direction of the clutch member 9. The means whereby the carrier 26 is rotated so as to bring its rollers 31 into contact with the wedges 35 will be later stated. The member 19 is also formed with a flange 36 which extends in opposite direction to the flange 20 and which immediately surrounds the shaft 7. Rotatably mounted upon this flange 36 is a brake-wheel 37 having a transverse flat annular rim 38. The inner face of one end of the rim 38 is formed with gear-teeth 39, the teeth having the form best shown in Fig. 2. Rotatably mounted on the eccentric portion 12 of the shaft 7 is a gear-wheel 40 having a base-flange or sleeve 41 which bears against the eccentric portion 12 and against the head 13. This gear-wheel 40 is provided with a screw-stud or like device 42, to which one end of a torsion spring 43 is attached. This torsion spring extends longitudinally, as shown in Fig. 1 and at its other extremity is connected to a rigid head 44 which is held from rotation in any suitable manner. As illustrated, the head 44 is provided with a stud 45 having a squared portion which engages a square opening in a bracket 46, this stud being screw-threaded for engagement with a nut 47. The outer face of the base-flange 41 of the eccentric gear is beveled and fitting against this outer face and held thereto by a clamp ring 48 is a tube formed of sheet metal, or like material, designated 49. This tube is clamped in place by the ring 48 and at its outer end is held in place within the hollow head 44, by means of a rotatable cap 50. This cap is annular in form and rotates within the annular hollow portion of the head 44 and preferably is formed with a race-way within which anti-friction balls 51 are disposed so that the head 50 may rotate freely. A sleeve 52 surrounds the tubular member 49 and is interposed between this tubular member and the torsion spring 43. The purpose of this sleeve 52 and the member 49 is to prevent contraction of the spring as it is wound up.

Disposed parallel to the shaft 7 at a point exterior to the internally toothed brake wheel 38 is a shaft 53. This shaft has an enlarged portion 55 at one end, its specific form being illustrated in Fig. 5. The opposite end of the shaft 53, from the enlarged portion or head 55, is screw threaded for engagement with a nut 57 (see Fig. 4) and surrounded by a washer 58. The head 55 of the shaft 53 is formed with a radially projecting arm 60 bifurcated at its end to carry roller 61 adapted to bear against the inside face 34 of the lug 33 on ring 27 as illustrated in Fig. 3.

Mounted upon the shaft 53 is an arm 62 or actuating lever which at its upper end is formed with a head 63 transversely bored as at 64 and having the projecting lug 65 extending in a plane radial to the axis of the bore 64. The arm 62 is held to the shaft 53 in any suitable manner as by a set screw 66. Also mounted upon the shaft 53 is a plate 67 having rearwardly projecting ears 68 formed with laterally projecting sleeves 69 bored as at 70 for the passage of the shaft 53 but independently rotatable with relation to the shaft. The web 5ᵈ, which extends inwardly from the casing 5, is provided with an elliptical slot or opening 59 and the web 18 with a similar slot or opening 56. The sleeves 69 seat in these openings and the shaft 53 is, therefore, free for limited vertical movement, as well as for turning movement. This plate 67 forms a brake actuating lever. The lug 65 as will be seen in Fig. 2, projects beneath the plate 67 and upon a rotative movement of the arm 63 in the direction of the arrow, Fig. 2, the lug 65 will lift upward on the plate 67. The ears 68 of the plate 67 are perforated as at 71 for the passage of a pin 75 (see Fig. 2) to which a brake band 76 is attached, this brake band having a width equal to the width of the rim 38 of the brake wheel 37. The other end of the brake band is formed with an outwardly projecting lug 77 through which passes an I-bolt 78 engaged by a nut 79 mounted upon the screw threaded portion of the bolt. The eye of the bolt 78 surrounds the shaft 53. It will thus be seen that upon a depression of the plate 67 the brake band or strap 76 will be drawn tight upon the rim of the brake wheel 37 and that when the plate 67 is raised the brake band will be loosened. This plate 67, therefore, with its ears 68 constitutes a brake applying lever.

It is to be particularly noted (see Fig. 2) that the eccentric portion 12 of the shaft 7 is formed with longitudinally extending recesses 73 which open upon the face of the eccentric portion of the shaft. These recesses 73 are approximately oval in section and disposed within these recesses are the rollers 74. It will be obvious now that upon a movement of the wheel 41 relative to the shaft in one direction, the rollers will be shifted into wedging engagement between the wheel 41 and the shaft, and that upon a movement of the wheel 41 in an opposite direction relative to the shaft, the rollers will be thrown out of their binding or wedging engagement so as to permit the wheel 41 to rotate freely upon the shaft.

The brake is held normally engaged with the brake wheel 37 by means of coil springs 81 and 82. There are a pair of these springs illustrated, both of the springs being coiled, and one spring being disposed within the other. The springs bear down upon a head 83 of a plunger whose spindle is designated 84. The action of the springs therefore is to depress the lever 67 and to apply the brakes and thus hold the brake wheel and the allied parts from rotation.

Mounted upon a stud 85 projecting from the annular wall or flange 18 is a latch 86. This latch is in the form of a slightly curved arm, one end of which is laterally bent as at 87 to bear against the curved face of the lug 33, as shown in Figs. 3 and 4. The pivot 85 of the latch is intermediate its ends and the butt end of the latch is laterally projected and formed with a stud 88 co-acting with the stud 32 (see Fig. 3) and disposed between these studs and supported thereby is a compression spring 89 which tends to hold the butt end of the latch pressed against the head 55 of the shaft 53. Any vertical movement of the shaft 53 will therefore act to force the butt end of the latch 86 upward and inward against the force of the spring 89 and force the free end of the latch downward out of engagement with the lug 33.

The casing 5 consisting of the sections 5ᵃ, 5ᵇ and 5ᶜ is rigidly supported in any suitable manner, as by brackets 90 bolted to the frame-work of the car. The casing section 5ᵇ is slotted as at 91 for the passage of the actuating lever 63. This actuating lever is adapted to be connected to a foot-treadle disposed convenient to the operator so that upon a depression of the foot-treadle the actuating lever will be forced in the direction of the arrow in Fig. 2, and upon a release of the foot-treadle the actuating lever will be returned to its original position. The spring 43 is surrounded by a cylindrical casing 92 of any suitable character attached at one end to a casing section 5°, the other end of the casing 92 being supported in any suitable manner, as by means of a bracket 93 and plate 46. The forward end of the shaft 7 is provided with a valved-nipple 94, whereby oil or other lubricant may be forced into a central duct running through the shaft and thereby transmitted to the bearings within which the shaft operates. The stud 45 is also formed with a central duct and is provided with a nipple 95 of like character to the nipple 94, whereby oil will be forced into the interior of the chamber inclosed by the tubular member 49, as illustrated in Fig. 1.

To understand the operation of my invention it is necessary to call attention to the fact that the power to wind up the spring 43 is received from the sprocket wheel 16 through the clutch members formed by the sprocket wheel and the member 9. The clutch member 9 is keyed upon the shaft 7 so as to rotate therewith. The gear-wheel 40 which is mounted upon the eccentric portion 12 of the shaft 7 has approximately one-third of its teeth in mesh with the teeth 39 of the gear-wheel 37. The teeth which are in mesh are the teeth on the side toward which the portion 12 is eccentric. The opposite side or low side of the eccentric does not permit the gear teeth on the wheel 40 to mesh with the integral gear 37 thereon. Therefore as the eccentric rotates with the rotation of the shaft 7 it will advance the gear-wheel 40 in an opposite direction to the rotative direction of the shaft 7. This reverse movement of the gear-wheel 40 is secured by reason of the fact that the gear wheel 37 is held stationary by the brake-bands. The oscillation of the gear-wheel 40 caused by the rotation of the eccentric portion 12 of the shaft 7 forces the gear in and out of mesh as the eccentric advances, leaving at least one-third or more of the teeth in mesh at all times, but as the eccentric advances it is continually advancing the gear-wheel 40, one tooth in every revolution of the shaft 7. The reason for this is, that the gear-wheel 40 has one less tooth than the internal gear wheel 37. Now assuming that the spring is wound up we will trace the delivery of its power back to sprocket wheel 1. As before stated only one-third of the teeth on gear wheel 40 mesh with the internal gear wheel 37 at all times. Therefore, when gear wheel 40 is held by means of the brake band it will hold the spring wound up, as the wedging engagement between the eccentric portion 12 and the gear wheel 40 will not permit the gear wheel 40 to rotate freely. When the brake band is loosened from the gear wheel 37 this gear wheel is free to travel as fast as gear wheel 40 and rotates therewith. The gear wheel 40 at this time is clutched to the shaft 7 and they will thus rotate the shaft. When the shaft 7 rotates under the power of the engine, the gear wheel 40 is unlocked from the shaft by the balls 74 moving into the larger portion of the recesses 73 and this gear wheel 40 is therefore forced to revolve in the opposite direction from the direction of rotation of shaft 7 and therefore wind up the torsion spring 43.

It is to be particularly noticed that the hub of gear wheel 37 is mounted upon the sleeve 36 projecting from the carrier 19, that is, concentrically with respect to the shaft 7. This construction does not permit gear wheel 40 and its shaft 7 to rotate together unless the gear 37 also rotates. As the gear wheel 37 is locked and as rotation of the gear wheel 40 to unwind the spring locks it to the shaft 7 by rollers 74, I provide a self locking device preventing the unwinding of the spring.

The operation of this form of my invention is as follows: Assuming that the spring 43 is wound and held from unwinding by the engagement of the brake-band with wheel 38, when it is desired to start the engine the actuating lever 62 is shifted in the direction of the arrow in Fig. 2. This causes a rotation of the shaft 53 and causes the roller 61 on the arm 60 to travel along the edge 34 of the lug 33. This lug is normally in the position shown in dotted lines in Fig. 3, and as a consequence, when the roller 61 contacts with the lug 33 it will move the lug downward, thus rotating the ring 27 of the carrier 26, carrying the rollers 31 into engagement with the cam faces 35. The engagement of the rollers 31 with the cam faces 35 will cause the lateral shifting of the carrier 26 and the clutch member 15, as shown in Fig. 1, and the clutch-teeth 14 and 17 will be thrown into engagement with each other. Thus the first portion of the movement of the lever 62 will be to cause the intermeshing of the driving sprocket-wheel 16 with the clutch-member 9 and thus with the shaft 7. A further movement of the actuating lever 62 will lift upward upon the free end of the brake-actuating lever 67 and this will release the brake 76. This upward movement of the lever 67 will be against the pressure of the springs 81 and 82 and these springs will be compressed at the end of the movement of the lever 62. As soon as the brake-band is released from the brake-wheel 38 the torsional tension of the spring 43 will cause a rotation of the gear-wheel 40 and as the brake-wheel 38 is free to move, will cause the rotation of this brake-wheel, of the shaft 7, sprocket-wheel 16, and the consequent rotation of the driving shaft of the engine. As soon as the motor is started the operator releases the foot-pedal or lever. This permits the lever 62 to drop back to its normal position and allows the springs 81 and 82 to lock the brake-band 76 upon the internal gear-wheel 37. The shaft is now rotating in the same direction as it was when under the unwinding action of the spring 43 but, the gear-wheel 40 is turned in a reverse direction to that previously described, so as to wind up the spring. This is secured by reason of the eccentric 12 rolling the gear-wheel 40 upon the gear-teeth 39 of the rim 38 which thus acts as a fixed internal gear. The rolling of the gear-wheel 40 upon this internal gear 39 will cause a rotation of the gear-wheel 40 in a direction reverse to the direction of rotation of the shaft 7. As before stated, immediately that the foot-pedal is released, springs 81 and 82 act to hold the brake-band tight upon the brake-wheel rim 38. As the gear-wheel 40 revolves and has rolling contact with the inner face of the brake-wheel 38 there will be a tendency to carry the brake wheel around with the gear-wheel and the brake-band around with the brake-wheel, this tendency being resisted by the springs 81 and 82 which resist any lifting movement of the brake-band lever 62. Eventually the torsion spring will be wound to such a tension that the lever 62 will be lifted bodily upward. This will raise the lever 67 and with it the shaft 53, approximately one-fourth of an inch. The elliptical openings 56 and 59 permit this raising movement. As soon as the shaft 53 has risen a quarter of an inch, the head 55 of the shaft engaging with the butt end of the lever 86 will depress the free end of the latch so that its free end will escape from engagement with the lug 33. This raising of the butt end of the latch will of course, compress the spring 89. As soon as the latch 86 has been moved downward beyond the end of the lug 33 so as to release the same, the spring 89 will be compressed and as soon as the latch has released its engagement with the lug 33, the spring 89 will force the carrier 28 in the direction of the arrow $b$ (see Fig. 3) and the rollers 31 will travel down the inclines 35 beneath the spring 24 to force the clutch 15 out of its engagement with the clutch member 9. This will disconnect the shaft 7 from the driving clutch-member 16 and stop the winding up of the spring. The springs 81 and 82 will now force down on the brake lever 67 and carry downward the shaft 53 to its normal position and hold the torsion spring locked until the actuating lever 62 is again operated.

In Figs. 7, 8 and 9 I show another form of my device which is substantially the same as the form previously described, except that in place of using the gear-wheel 40 I provide a planetary gear whereby the shaft of the starter may be used to wind up the torsion spring or be rotated by the torsion spring. In these figures 100 designates the shaft of the starter which is the equivalent of the shaft 7, previously described. Mounted upon the shaft 100 is the clutch-member 102. To the casing 103 inclosing the starter there is attached a web 104 analogous to the member 19, previously described, which is provided with the flanges 105 and 106 spaced from each other. This web and its flanges with their cams is clearly shown in Fig. 9. Disposed in this space between these two flanges is an annular sleeve 107 carrying the sprocket wheel 108, the inner face of which is provided with teeth 109 engageable with the teeth on the clutch-member 102. A spring 110 acts to force the clutch-member 107 away from the clutch-member 102, this spring bearing against the washer 111. A brake-wheel 112 is surrounded by the band-brake 113, this brake-wheel being rotatable upon a hub formed upon the member 104. The brake-band as in the former construction is attached at one end to a stud 114 formed upon a head 115 forming part of the lever 116 and rotating upon a shaft 117. The other end of the brake-band carries the lug 118 through which passes the eye-bolt 119 engaged by a nut 120. The brake-band lever 121 is forced down by means of a spring 122 of the same character as the spring 81. Rotatably mounted upon the shaft 117 is the actuating lever 121 whose upper end is formed with an inwardly turned lug 123. This actuating lever has substantially the same form as that shown in Fig. 5. The arms of the member 104 are wedge-shaped, as shown at 35' in Fig. 9, corresponding to the cams 35 of the member 18. Rotatably mounted on the flange 105 is the carrier 124 whose opposite ends are slotted and provided with rollers 125 which are engageable with the wedge-shaped arms of the member 104, as the carrier is rotated. This carrier is in all respects the same as the carrier 28, previously described. The carrier is provided with an outwardly projecting lug of the same character as the lug 33, this carrier being adapted to be engaged by a latch, equivalent to the latch 86, and by an arm carried on the end of the shaft 117. Inasmuch as all these parts are the same as those previously illustrated, it is not deemed necessary to illustrate them again.

The chief difference between the construction illustrated in Figs. 7 and 8 and that previously described is that the shaft 100 is provided adjacent its inner end with gear teeth 126 which are adapted to mesh with a plurality of pinions 127, these pinions being carried on pins 128 which project out from the vertical flange 129 of the brake wheel 112. The pinions 127 mesh with an internal gear 130 formed as part of a gear wheel 131 having a sleeve 132 which rotates freely upon the extremity of the shaft 100. A torsion spring 133 is connected at one end to this gear wheel in a manner previously described for the spring 43.

Disposed in the inner face of the brake wheel 112 are the wedge shaped slots 134 in which are disposed the ratchet rollers 135 which are adapted to contact with the outer face of the wheel 130. When this wheel 130 moves in one direction relative to the brake wheel 112 the wheels will be locked together by the rollers 135 and when the wheel 130 moves in the opposite direction the wedging action of the rollers 135 will be relieved and the wheels 130 and 112 will rotate independent of each other. When the shaft is driven in one direction it will transmit motion to the gear wheel 131 through the pins 128 and the three idle pinions 127, but rotation of the shaft 100 in the other direction will drive the gear wheel 131 in the reverse direction from the direction of movement of the shaft 100. Therefore, the wedging rollers 135 are free to roll out in the larger portions of the slots 134 and remain there until the spring is wound up. As soon as the clutch members 108 and 102 disengage by the action of the mechanism heretofore described, the spring 133 would naturally tend to unwind. This unwinding movement of the spring will rotate the gear wheel 131 in the reverse direction to that first-named and immediately the wedging rollers 135 will roll back into a pair of slots and the wheels 112 and 131 are locked by means of the rollers 135. This prevents an unwinding of the spring and holds the springs in a wound up condition just as long as the brake-band 113 is clamped upon the brake-wheel 112 and prevents any rotation of the brake-wheel. When the brake-band 113 is released, however, it permits the gear-wheel 131 and the brake-wheel 112 to travel as one unit. As the pins upon which the pinions 127 rotate are all a part of the brake-band wheel and as the brake-band wheel travels with the same speed as the gear wheel 131 the whole system of gears is locked. The pinions cannot rotate and therefore they act to drive the shaft 100.

In the practical operation of my invention the wiring from the battery and the magneto of an automobile will be so arranged that when the lever 63 is brought over to release springs 81 and 82 it will bring in circuit the battery and magneto current as well as opening the throttle of the carbureter. This will prevent any one from attempting to start the engine and neglecting to put on the switch or open the throttle valve and thus prevent the operator from allowing the spring to run down without starting the motor so that the spring may be rewound. As soon as the motor is started the spring 43 immediately winds up and when once found the arm 62 flies back to its original place and breaks the circuit from the battery and magneto and thus lets the motor stop unless the operator puts on the regular switch which he should have done. This arrangement is made for the purpose of overcoming the operator's mistakes.

In Fig. 4 I have illustrated a flat double spiral brake band applied to the brake wheel, in other words a brake band extending spirally around the brake wheel, while in Figs. 7 and 8 I have illustrated a plain flat brake band. The double spiral brake band is to be used where only a relatively small brake wheel is necessary and can be run in oil without deteriorating its braking qualities. This will add to the life of the brake band and brake wheel and also make it noiseless.

While I have illustrated what I believe to be the best forms of my invention I do not wish to be limited thereto as it is obvious that many changes might be made without departing from the details of construction.

What I claim is:—

1. A mechanism of the character described including in its organization a power shaft, a power transmission device shiftable into and out of engagement with the power shaft, a torsion spring operatively connected at one end with the power-shaft, means for shifting the transmission device into engagement with the power shaft to rotate the same in a direction to wind up the spring, and means actuated by the increase of the tension in the spring beyond a predetermined point automatically shifting the transmission device out of engagement with the power shaft.

2. A mechanism of the character described, including in its organization a power shaft, a power transmission device shiftable into and out of engagement with the power shaft, a torsion spring, means operatively connecting the torsion spring to the shaft, means for shifting the transmission device into engagement with the shaft to rotate the shaft in one direction and thereby wind up the spring, means for holding the spring from reverse rotation after the spring has been wound up and automatically disconnecting it from the power transmission device, and means for releasing said holding means and simultaneously shifting the power transmission device into engagement with the shaft whereby to transmit power from the spring.

3. A mechanism of the character described, including in its organization a shaft, a torsion spring, means operatively connecting the spring to said shaft to transmit power to or receive power from the latter, means shiftable into or out of operative engagement with the shaft to apply or receive power therefrom, means for holding the spring from reverse rotation after the spring has been wound up, and means causing a disengagement between the shaft and the power transmitting device after the spring has been wound to a predetermined tension.

4. A mechanism of the character described, including in its organization a shaft, a torsion spring, means operatively connecting the spring and the shaft whereby power may be transmitted from the spring to the shaft or from the shaft to the spring, means shiftable into or out of operative engagement with the shaft to apply or receive power therefrom, means for holding the spring from rotation after the spring has been wound up, and means for automatically causing a disengagement between the shaft and the power transmission device after the spring has been wound to a predetermined tension.

5. A mechanism of the character described, including a shaft, a power transmitting device shiftable into and out of engagement with the shaft and adapted to transmit power to or receive power from the shaft, a torsion spring, means for transmitting the unwinding power of said spring in one direction, means acting to rewind the spring upon a continued rotation of the shaft in the same direction, and means for automatically disconnecting the shaft from the power transmitting device when the spring has been wound to a predetermined degree of tension.

6. A mechanism of the character described, including a shaft, means for transmitting power to the shaft or taking it therefrom, said means being shiftable into or out of operative engagement with the shaft, a spring, means operatively connecting the spring to the shaft to transmit power from the spring to the shaft or from the shaft to the spring, means for holding the spring from rotation but shiftable to release the spring, manually-operated means for shifting the transmission device into engagement with the shaft and releasing said spring-holding means, means for reapplying the spring holding means upon a release of the manually-actuated means, and means for automatically disconnecting the power transmitting device from the shaft when the spring has been wound to a certain tension by the rotation of said shaft.

7. A mechanism of the character described including in its organization a spring, a power transmitting device movable into or out of operative engagement with the spring and adapted to receive power from or transmit power to the spring, means for shifting said device into and out of operative engagement with the spring, means for holding the spring from rotation after it is wound up, means for manually releasing said holding means to permit unwinding of the spring and the transmission of power to the transmission device, means for operatively reëngaging said holding means with the spring upon a release of the manually actuatable means, and means for automatically disengaging the power transmission device from its operative engagement with the spring when the spring has been rewound to a predetermined tension.

8. A mechanism of the character described, including in its organization a torsion spring, a shaft, means on the shaft whereby an unwinding of the spring will transmit motion to the shaft in one direction, a power transmitting device movable into or out of engagement with the shaft, means normally holding the spring and shaft from rotation in one direction but shiftable to release the spring and shaft, means for rewinding the spring upon a continued rotation of the shaft in the same direction when the spring is unwound, and means for releasing the shaft from its engagement with the power transmitting device when the spring has been wound.

9. A mechanism of the character described including in its organization a torsion spring, a power transmitting shaft, a clutch member on said shaft, a shiftable clutch member loosely mounted on the shaft, means for transmitting power to or from said shiftable clutch member, means for causing a rotation of the shaft with the torsion spring upon a movement of the torsion spring and shaft in a direction to unwind the spring, means for causing a reverse rotation of the free end of the spring to wind the same upon a continued movement of the shaft in the first-named direction, means for holding the spring from rotation, manually operated means for releasing said holding means to permit the spring to unwind and for simultaneously shifting the shiftable clutch member into engagement with the clutch member on the shaft, and means for automatically shifting the shiftable clutch member out of such engagement when the spring has been wound to a predetermined tension.

10. In mechanism of the character described, a power spring, a brake-wheel operatively engaged by said spring, braking mechanism engaging said wheel, yielding means urging said braking mechanism into engagement with the wheel, a power transmitting device operatively connected to the spring, and means actuated by a bodily shifting of the braking mechanism against the force of said yielding means acting to release the power transmitting device from its operative engagement with the spring.

11. A mechanism of the character described including a power transmission shaft, a clutch member mounted thereon, a clutch member shiftable into and out of engagement with the first-named clutch member, means for transmitting power to or from said second-named clutch member, manually operated means for shifting the clutch member into engagement or out of such engagement, a latching member holding said clutch member shifted, a spring operatively connected to the shaft to rotate the shaft in one direction, a brake-wheel mounted upon the shaft and operatively connected to the spring, a brake surrounding said brake wheel, manually-operated means for releasing the brake, springs urging the brake into braking engagement with the brake wheel and means for releasing said latching member.

12. A mechanism of the character described including a torsion spring, power-applying mechanism, means operatively connecting the power-applying mechanism to one end of the torsion spring, means for automatically resisting the winding up of the said end of the spring while it is being wound, said means yielding when the torsion spring has reached a sufficient degree of tension to overcome the resistance of said resisting means, and means operated by the yielding of said resisting means for disconnecting the power-applying mechanism from its operative engagement with the torsion spring, said resisting means preventing a reverse movement of the torsion spring when the power-applying mechanism is disconnected therefrom.

13. A mechanism of the character described including a shaft, means for applying power thereto or receiving it therefrom, a member loosely mounted upon one end of the shaft, a torsion spring disposed concentrically to the axis of the shaft and connected to one end of said member, means for holding the other end of the torsion spring from movement, a brake-wheel loosely mounted on the shaft, operative connection between the brake-wheel and the shaft, a brake co-acting with the brake-wheel, means for operatively connecting the shaft with the said member to wind up the spring, means for applying power to said brake when the spring is wound up, means for automatically disconnecting the shaft from the power-applying means when the spring is wound up, and manually-operated means for connecting the power-applying or receiving means to said shaft and for simultaneously releasing said brake.

14. A mechanism of the character described including a shaft, a fixed and a movable clutch member mounted upon the shaft, means for transmitting power to or from the movable clutch-member, a spring rigidly held at one end, a gear-wheel loosely mounted upon the shaft to which the other end of the spring is attached, a brake wheel loosely mounted on the shaft and operatively geared with said gear wheel to rotate therewith and with the shaft when the brake-wheel is released, said gear connections being arranged to cause a movement of the gear wheel reverse to that of the shaft when held from movement, a brake-band on the brake wheel adapted to hold the wheel from movement, spring-operated means contracting the brake-band upon the brake-wheel, manually-operated means for loosening said brake-band against the force of the spring, means acting to shift the shiftable clutch member into engagement with the fixed clutch-member when the brake-band is loosened, means permitting the action of the spring to cause a clamping of the brake-wheel when the manually-operated means is released to thereby hold the brake-wheel from rotation, and thereby cause a movement of the gear-wheel reverse to that of the shaft, and means acting to shift the shiftable clutch member out of engagement with the fixed clutch member when the spring has been wound to a predetermined tension.

15. A mechanism of the character described, including a shaft, a fixed and movable clutch member mounted on the shaft, means for transferring power to or from the shiftable clutch member, a torsion spring mounted in alinement with the shaft, a toothed gear wheel mounted on the shaft to which the free end of the spring is attached, a brake-wheel loosely mounted on the shaft and operatively geared with said gear-wheel to rotate therewith and with the shaft when the brake-wheel is loose, said gear connections being arranged to cause a reverse movement of the gear-wheel relative to the shaft when the brake-wheel is held from movement, a brake-band on the brake-wheel, spring-operated means holding the brake-band contracted on the wheel, manually-operated means for loosening said brake-band against the force of the spring, means acting to shift the shiftable clutch-member into engagement with the fixed clutch member when the brake-wheel is loosened, means acting to permit the spring to clamp the brake-band upon the brake-wheel when the manually-operated means is released to thereby hold the brake-wheel from rotation and thereby cause a rotation of the gear-wheel reverse to that of the shaft to wind up the spring, and means operated when the tension of the spring has reached a predetermined point acting to shift the shiftable clutch member out of engagement with the fixed clutch member.

16. A mechanism of the character described, including a shaft, a fixed and a movable clutch member mounted on the shaft, means for transmitting power to or from the movable clutch member, a torsion spring disposed in alinement with the shaft and held at one end, a toothed gear-wheel loosely mounted on the shaft to which one end of said torsion spring is attached, a brake-wheel loosely mounted on the shaft and operatively geared with said gear-wheel to rotate therewith and with the shaft when free to move, said gear connections being arranged to rotate the gear-wheel in an opposite direction to the shaft when held from movement, a brake-band on the brake-wheel, spring-operated means holding the brake-band tightened, manually-operated means for loosening the brake-band against the force of the spring to permit the rotation of the brake-wheel with the gear-wheel, a rotatable member mounted concentric to the shaft and operatively engaging the shiftable clutch member, said rotatable member being operatively connected to said brake-band whereby when the brake-band is released the rotatable member will engage the shiftable clutch member to shift it into engagement with the fixed clutch-member, and when the brake-band is tightened to a degree causing it to rotate under the torsion strain applied to the brake-wheel said rotatable member will move out of engagement with the shiftable clutch-member to thereby release the clutch-members from their engagement with each other.

17. A mechanism of the character described, including a shaft, a fixed and a movable clutch member mounted on the shaft, means for transmitting power to or from the movable clutch member, a torsion spring arranged in alinement with the shaft and rigidly held at one end, a toothed gear wheel loosely mounted on the shaft to which the other end of the spring is attached, a brake-wheel loosely mounted on the shaft and operatively geared to said gear wheel to rotate therewith and with the shaft when the brake-wheel is free to move, the gear connections being arranged to rotate the gear wheel in an opposite direction to that of the shaft when the brake-wheel is held from movement, a brake-band on the brake-wheel, a shaft parallel to the first-named shaft, a lever mounted on the shaft and having diametrically opposed pins operatively engaging the opposite ends of the brake-band, a spring normally acting against the end of the lever to cause a contraction of the brake-band, manually-operated means for engaging said lever to shift it upward against the force of the spring and thereby rotate the shaft in one direction, a frame mounted concentric to the shaft and having diametrically disposed wedging members, a carrier mounted concentrically on the shaft and having rollers engageable with said wedging members when the carrier is rotated to thereby shift the carrier outward, said carrier being adapted to engage the shiftable clutch member and when moved outward shift the clutch-member into engagement with the fixed clutch member, means on the shaft for rotating said carrier to bring it in engagement with the wedging members, means for latching said carrier in engagement with the wedges, and means operated by the bodily shifting of the shaft with the brake-band and brake-wheel acting to trip the carrier and permit its return to normal position to thereby permit the return of the shiftable clutch member to its normal position and its disengagement from the fixed clutch member.

In testimony whereof I affix my signature in presence of two witnesses.

BOYD K. APPLEMAN.

Witnesses:
L. E. NEY,
W. M. CROOK.

Copies of this patent may be obtained for five cents each, by addressing the "Commissioner of Patents, Washington, D. C."